W. B. STORY.
REGISTER DEVICE FOR FEEDERS.
APPLICATION FILED JUNE 20, 1912.

1,160,210.

Patented Nov. 16, 1915.
3 SHEETS—SHEET 1.

Witnesses:

Inventor
Ward B. Story

Attorneys.

UNITED STATES PATENT OFFICE.

WARD B. STORY, OF NEW YORK, N. Y., ASSIGNOR TO WARD B. STORY COMPANY, INC., OF NEW YORK, N. Y., A CORPORATION OF NEW YORK.

REGISTER DEVICE FOR FEEDERS.

1,160,210.  Specification of Letters Patent.  Patented Nov. 16, 1915.

Application filed June 20, 1912.  Serial No. 704,707.

*To all whom it may concern:*

Be it known that I, WARD B. STORY, a citizen of the United States, residing in the borough of Brooklyn, county of Kings, city and State of New York, have invented a certain new and useful Register Device for Feeders, of which the following is a specification.

The object of this invention is to produce a machine for timing and straightening sheets from a feeder without arresting the forward movement of the sheets or losing control of them at any time.

According to this invention, I avoid the use of belts or tapes for moving the sheets to the gages. Belts or tapes are objectionable for this purpose. The wear on the different tapes is usually unequal, which will cause irregularities in the feed. The feed by belts or tapes is not positive. The belts or tapes stretch, and require frequent attention. Each belt or tape requires its own tightening devices, which adds to the complexity of the machine. The greatest objection is caused by the lapped or jointed ends of the belt or tape, usually called the "butt," which produces an irregularity in the surface which supports the sheet, thus causing distortions of the sheets, such as wrinkling or buckling. By the present invention, these objectionable features, caused by the use of the tapes, are removed.

A further object is to produce a machine in which the rapidity of feed is increased, at the same time absolute regularity of gaging is secured.

These and further objects will more fully appear from the following specification and accompanying drawings, considered together or separately.

Figure 1 is a plan view of a portion of a feeding machine embodying my invention. Fig. 1$^a$ is a detail plan view of the feeling finger. Fig. 1$^b$ is a side elevation of the finger and holding-down blades. Fig. 1$^c$ is a diagrammatic view of one form of accelerating mechanism used in the structure illustrated in Fig. 1. Fig. 2 is a side elevation of the parts shown in Fig. 1. Fig. 2$^a$ is a detail view of one of the holding-down blades and the support therefor. Fig. 3$^a$ is a detail section of a portion of the mechanism shown in Fig. 3. Fig. 4$^a$ is a plan view of a portion of the device shown in Fig. 3.

In all of the figures, like parts are designated by the same reference characters.

In the embodiment chosen for illustration, the various instrumentalities for performing the functions of the invention are carried within or supported by the frame 1. The parts are so arranged that the sheets are fed from right to left. The pile feeder, or other device for inserting the sheets in the machine, is not shown. Any suitable device can be used for this purpose. The sheet first passes over the front feeding roller 2. This roller is engaged by the front drop rollers 3, 3$^a$. All of the instrumentalities indicated by the exponent $a$, in the drawings, and also in the specification,— which are located on the right hand, looking from the entrance end of the machine, are adjustable toward and away from the left hand side, to accommodate varying widths of sheets. The sheet passes from between these rollers 2 and 3 and 3$^a$ upon the table 4. It is next engaged by the intermediate feeding rollers 5, 5$^a$. These rollers are engaged by the drop rollers 6, 6$^a$. These drop rollers hold the sheet in contact with the feeding rollers. The sheet then passes to the rear intermediate rollers 7, 7$^a$. These rollers are engaged by the drop rollers 8, 8$^a$. The front tape rollers 9, 9$^a$ are preferably formed as a part of the rear intermediate rollers, so as to turn at the same speed. The tapes 10, 10$^a$ are continuous. Each tape carries a gage 11 or 11$^a$. For the purpose of running the tapes in unison, each is provided with teeth 12 on the inner side. These teeth engage in notches 13 formed on the tape rollers. The other ends of the tapes are supported upon the rear tape rollers 14, 14$^a$. The sheet next passes to the rear feed rollers 15, 15$^a$. These feed rollers are engaged by drop rollers 16, 16$^a$. These various rollers and tapes are so positioned that they engage with the sheet adjacent to the side edges thereof. For the purpose of driving these various rollers, a longitudinal shaft 17 is provided (see Fig. 1). This shaft is rotated by suitable mechanism (not shown). This shaft is provided with miter gears 18. These miter gears connect to and drive a shaft 19. The shaft 19 supports the front feed rollers 2, and rotates the same. Miter gears 20 are connected to a shaft 21. This shaft 21 supports the intermediate feed rollers 5, 5ª. A shaft 22 (see Fig. 4) is mounted in suitable bearings in the frame. This shaft 22 is provided with a gear 24 (see Fig. 4). The gear 24 is rotated by a pinion 25. A second pinion 26 is enmeshed with the pinion 25 (see Fig. 1). This pinion 26 is rotated by a miter gear 27 from the shaft 17.

Figure 4:
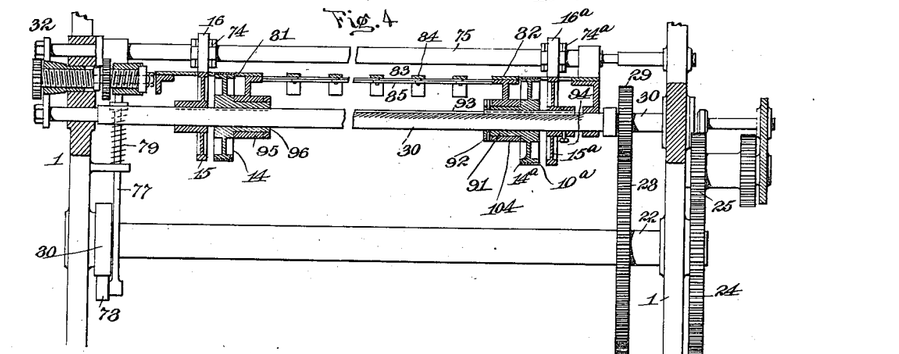
Fig. 4 is a section on the line 4—4 of Fig. 1, looking in the direction of the arrow.
Figure 4A:
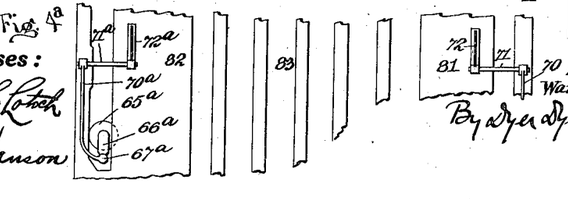

The shaft 22 carries a gear 28 (see Fig. 4). This gear 28 meshes with and rotates a pinion 29. The pinion 29 is mounted upon and rotates a shaft 30. This shaft 30 carries the rear tape rollers 14, 14ª, and the rear feed rollers 15, 15ª.

The rollers 14ª and 15ª are adjustable longitudinally upon their supporting shaft, for the purpose previously described.

Figures 1, 1A, 1B:
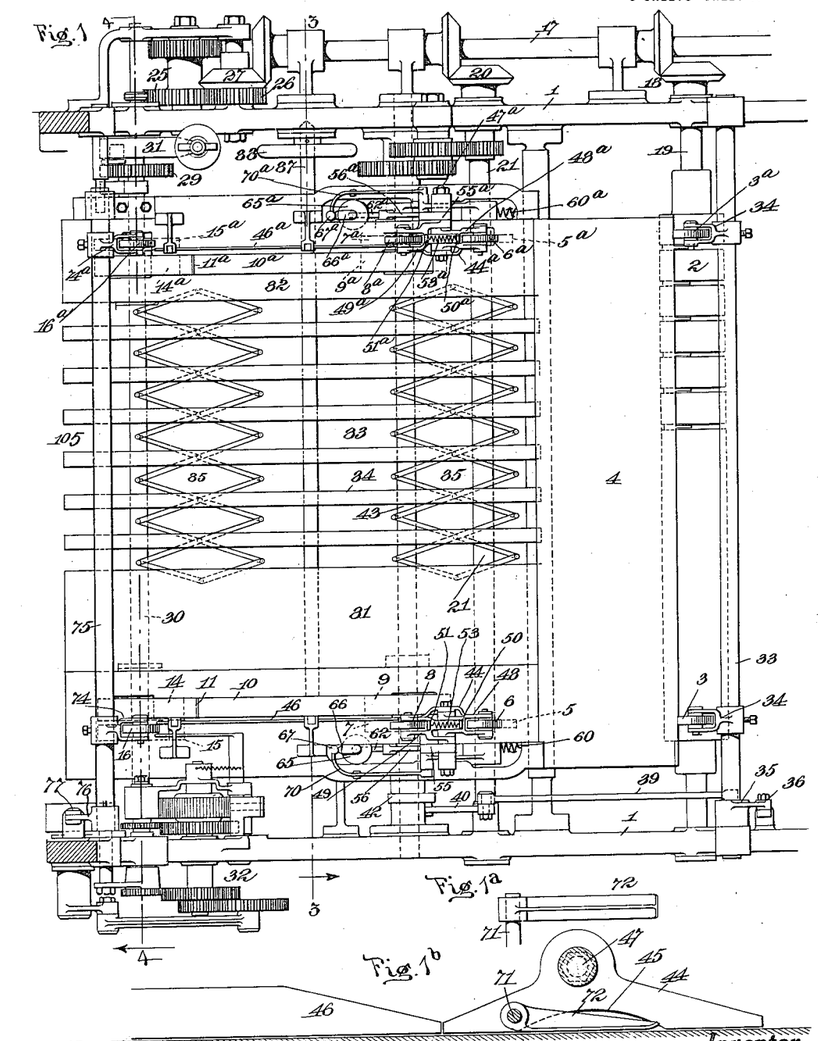
Figure 1C:
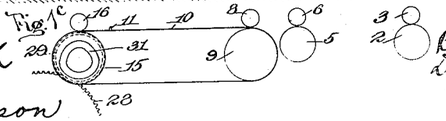

The shaft 30 carries a cam 31 (see Figs. 1 and 1ᶜ). This cam 31 is connected with the pinion 29, so as to rotate the latter with a regulated accelerating and retarding movement. A suitable device for this purpose is shown in my application filed March 12, 1912, Serial No. 683,331. Fig. 1 shows a side register mechanism 32. This mechanism is similar to that described in my co-pending application filed April 12, 1912, Serial No. 688,805.

The means for actuating the drop rollers 3, 3ª will now be described. Each drop roller 3 and 3ª is suitably supported by the rock shaft 33 by means of arms 34. The drop roller 3ª is adjustable along the shaft, for the purpose before described. The shaft 33 is provided with a bell crank 35. One arm 36 of the bell crank is connected to a suitable spring 37. The expansion of this spring tends to rotate the shaft 33 and to press the drop rollers 3, 3ª against the feeding roller 2. The second arm 38 of the bell crank 35 is connected by means of a pitman 39 to a bell crank 40. This bell crank 40 is carried upon the shaft 21. A roller 41 on one arm of the bell crank 40 engages against a cam 42. This cam 42 is carried upon a shaft 43. The cam is so shaped that the drop rollers 3, 3ª will be lifted when the sheet gets under control of the rollers 5 and 6, 6ª, and will be lowered at the proper time to take and forward the next sheet. The shaft 43 carries the rear intermediate feeding rollers 7 and 7ª and the front tape rollers 9 and 9ª. The rollers 7ª and 9ª are adjustable longitudinally upon the shaft for the purpose already described.

I will now describe the mechanism, in the order in which the sheets are engaged after they leave the rollers 2 and 3, 3ª. The sheets first pass on to the table 4. Before they are engaged with the rollers 5 and 6, 6ª they will come under the front holding-down blades 44, 44ª. These front holding-down blades are best shown in Fig. 1ᵇ. The blades are arranged immediately inside of the intermediate drop rollers and contiguous to the intermediate feeding rollers. The front holding-down blade 44ª, is adjustable longitudinally upon its support, to accommodate various widths of sheets. The blades are so positioned that they hold down the edges of the sheet. Each front holding-down blade is provided with a cut-out portion 45 (see Fig. 5). The cut-out portion is for the purpose of accommodating the buckle which will be formed in the sheet when it comes into contact with the gages, or is irregularly fed. The sheet in its travel through the machine will next be confined by the rear holding-down blades 46, 46ª. The blade 46ª is adjustable with its support to accommodate various widths of sheets.

Figure 5:
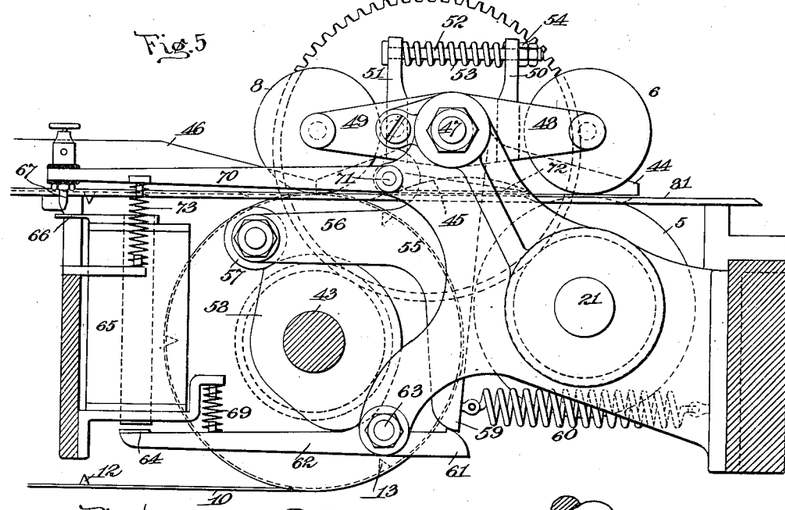
Fig. 5 is an enlarged side elevation of the buckle detecting mechanism.
Figure 6:
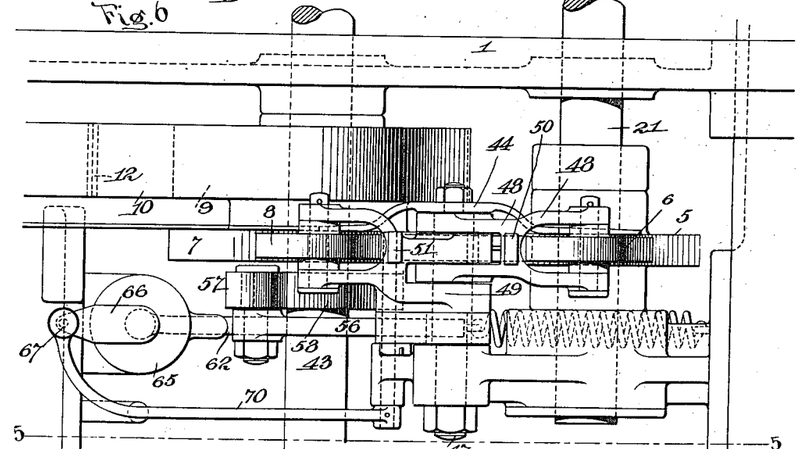
Fig. 6 is a plan view of the same.
Figure 7:
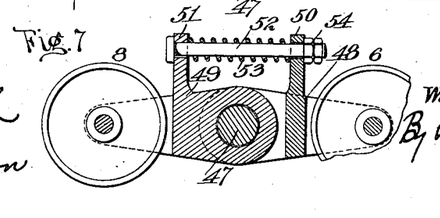
Fig. 7 is a detail sectional view of the intermediate drop rollers and the supports therefor.

The front holding-down blades are carried upon supports 47 and 47ª (see Figs. 5, 6 and 7). These supports also carry the drop rollers 6, 6ª and 8, 8ª. The drop rollers 6, 6ª are carried upon arms 48, 48ª. These arms are pivoted to the supports 47, 47ª. The drop rollers 8, 8ª are carried upon arms 49, 49ª. These arms are also pivoted to the supports.

For the purpose of lifting and depressing the drop rollers, the following mechanism is employed: I will first describe the mechanism which is located on the left side of the machine. The mechanism on the right side is adjustable in position laterally to accommodate different widths of sheets, and the different parts are indicated on the drawing by the exponent a. In addition, the drop rollers 6 and 8, and 6ª and 8ª, are independently actuated to accommodate irregularities in feeding, as will be described.

The arm 48 is provided with a finger 50. The arm 49 is provided with a finger 51. These two fingers are connected together by a bolt 52. A spiral spring 53 surrounds the bolt. A nut 54 on the end of the bolt permits adjustment. The expansion of the spring will separate the fingers 50 and 51, and will tend to force both drop rollers 6 and 8 into contact with the feeding rollers 5 and 7. The adjustment of the nut 54 is such that both drop rollers 6 and 8 cannot engage at the same time with their respective feeding rollers. When the sheet is between two of the rollers, for example,—rollers 5 and 6,—the rollers 7 and 8 will not come in contact.

For the purpose of raising the drop roller 6, the following devices are employed: The arm 48 carrying the drop roller is connected to a bell crank lever 55. One arm 56 of this lever is provided with a roller 57. This roller engages with a cam 58. The cam 58 is mounted on the shaft 43. As the cam rotates on the shaft 43, engagement of the roller 57 with it will oscillate the bell crank lever 55 upon the support 47, raising or lowering the drop roller 6. This cam 58 is so proportioned that the drop roller will be raised and depressed at the proper moment, as will be described. A second arm 59 on the bell crank lever 55 is connected to a spring 60. This spring tends to hold the roller 57 in contact with the cam 58. The free end of the arm 59 engages with a latch 61. This latch is carried by a lever 62. This lever 62 is pivoted at 63 to a portion of the frame 1. The other end of the lever 62 carries an armature 64. In proper position in relation to the armatures is a magnet 65. A switch contact member 66 is provided in connection with the magnet. A correlative switch contact member 67 is provided in connection with an electric circuit 68 (see Fig. 2).

A spring 69 engages with the lever 62 and normally tends to separate the armature from the magnet. The switch contact member 67 is carried by a lever 70. The lever 70 is supported upon a rock shaft 71. A feeling finger 72 is carried upon the rock shaft 71. A spring 73 normally tends to separate the switch members.

The feeling finger is normally just above the table 81 (to be described), and alongside of the front holding-down blade 44. Sufficient space is provided between the table and finger to allow the sheet to freely travel. Any distortion or buckling of the sheet upward, will raise the finger.

The operation of this portion of the mechanism is as follows:—When the sheet is fed into the machine, the front edge will come into contact with the stop 11. The effect of this will be to buckle the sheet or raise it up into the cut-away portion in the blade 44. This will raise the feeling finger 72. This movement will oscillate the rock shaft 71 and depress the lever 70. This will bring the two switch members on that side of the machine into contact, the electric circuit on that side will be completed, and the magnet 65 will be energized. The armature 64 will be attracted by the magnet. The lever 62 will be rotated upon its pivot, and the latch 61 will be disengaged from the arm 59. The effect of this will be to allow the spring 60 to retract the bell crank lever 55 and lift the drop roller 6 from the intermediate feeding roller 5. The sheet will no longer be fed forward, owing to the separation of the feeding and drop rollers. It is, of course, understood that the roller 57 must be opposite the depressed portion of the cam 58 at this time. If the sheet is irregularly fed, the edge which is in advance will come first into contact with the gage 11 or 11$^a$, and will buckle, raising the feeling finger on that side, while the other side or edge is continued to be fed forward. The detailed description of the feeding will follow after the entire machine has been described.

For the purpose of raising the drop rollers 16 and 16$^a$ at the proper time, the following mechanism is employed: Referring to Fig. 4, it will be seen that the drop rollers 16 and 16$^a$ are supported by the arms 74, 74$^a$. These arms are carried by the rock shaft 75. This operates both drop rollers at the same time, so that the sheet, which has had its front edge properly alined by means of the mechanism just described, will be fed forward without losing its alinement. Its front register is true, caused by the operation of the mechanism previously described. The drop roller 16$^a$ is adjustable longitudinally upon the rock shaft for the purposes before mentioned. This rock shaft 75 is rocked or oscillated by means of the lever 76. A rod 77 is connected with this lever and moves it. On one end of the rod is a roller 78. A spring 79 normally tends to elevate the rod 77 and yieldingly hold the drop rollers 16, 16$^a$ in contact with the rear feed rollers, 15, 15$^a$. A cam 80 carried by the shaft 22 engages with this roller 78 and moves the rod 77 at the proper time to raise the drop rollers at the proper point in relation to the sheet.

In order to support the sheets when engaged by the intermediate feeding rollers, I provide a stationary table 81 (see Fig. 1), and a sliding table 82. The sliding table is adjustable across the width of the machine, to accommodate varying widths of sheets. Between the two tables is the collapsible table 83. This table is formed of slats 84 connected together and to the sliding table and the stationary table by means of the lazy tongs 85.

Figure 3:
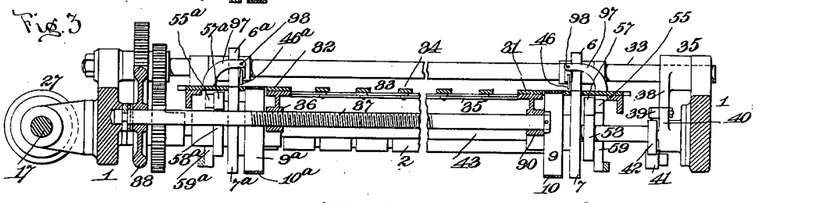
Fig. 3 is a section on the line 3—3 of Fig. 1, looking in the direction of the arrow.

For the purpose of adjusting the various instrumentalities carried by the table 82, and which are designated by the exponent "$a$", and also to adjust the width of the table, the following devices are provided: Referring more particularly to Fig. 3, a nut 86 is connected to the sliding table 82. This nut engages with the threaded portion of a shaft 87. One end of this shaft is mounted in a suitable bearing in the frame. It is rotated by a hand wheel 88. A bearing 90 on the fixed table 81 supports the other end of the shaft, and a collar holds the shaft against longitudinal movement.

Referring to Fig. 4, the supports for the rear tape roller 14$^a$ are shown. This roller is provided with an extension 91. This extension is mounted in a bearing 104, connected to the sliding table 82. A suitable collar 92 is provided to prevent longitudinal movement of the extension within the bearing. The shaft 30 is provided with a key-way 93. This key-way engages with a key carried by the rear tape roller 14ª and the rear feed roller 15ª. A set screw 94 secures the rear feed roller 15ª on the shaft 30. This set screw is loosened up when the table 82 is slid. When the table is slid, it carries the bearing 104, and the tape roller 14ª with it. The necessity of having the set screw is to lock the feed roller 15ª to the shaft 30, which is required for the operation of the side register mechanism described in my co-pending application Serial No. 688,805. The other rear tape roller and rear feed roller 14 and 15, respectively, are connected to the shaft in the manner shown in Fig. 4. The roller 14 engages with a bearing 95 on the stationary table 81. The roller 14 is provided with a hub 96, which is mounted within the bearing. The rollers 15ª and 15 are not movable relatively to the shaft 30. It follows, therefore, that when the shaft 30 is longitudinally moved for side register, it will carry the rollers 15 and 15ª and with them the sheet to be registered, but will not carry the rollers 14 and 14ª. The tapes are not moved for the reason that the shaft is movable relatively to the rollers 14 and 14ª.

Figures 2, 2A, 3A:
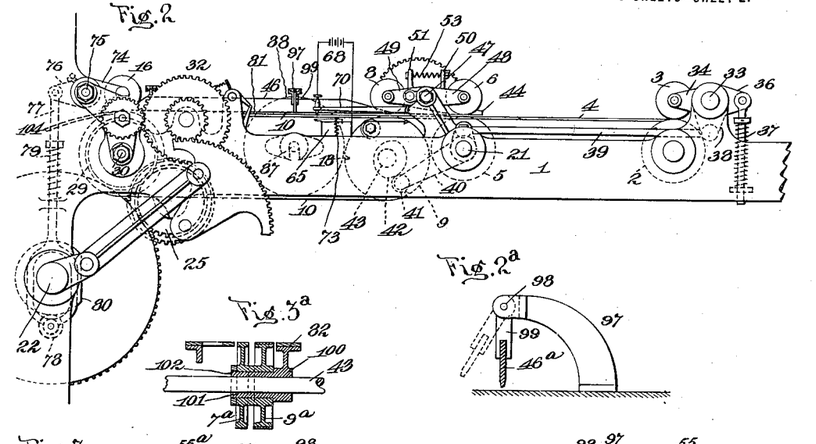

The rear holding-down blades 46 and 46ª are so mounted that they can swing inward. This is desirable in the event of a sheet becoming caught in the machine. The operator can grasp the sheet and pull it upward, the holding-down blades swinging upon their pivots inward and releasing the sheet. The details of this construction are best shown in Fig. 2ª. The blade 46 or 46ª is supported by the brackets 97. These brackets are carried by the stationary table 81 and sliding table 82. A pivot 98 is connected to an arm 99, and this arm carries the blade. Fig. 3ª illustrates the support for the adjustable rear intermediate feeding roller 7ª and front tape roller 9ª. These rollers are supported upon the shaft 43. A bearing 100 depends from the sliding table 82. This bearing supports the shaft 43. The bearing is provided with an extension 101. The hub 102 of the rollers 7ª and 9ª is mounted upon this extension. A suitable collar 103 holds the hub in position. As the table 82 is slid, these rollers move with it.

The table has an extension 105 to support the sheet before it is grasped by the grippers on the taking cylinder, or other device. My application, Serial No. 692,393, filed April 22, 1912, shows one form of taking device suitable for the purpose. Any other device may be employed.

The operation of the complete machine is as follows:—Referring more particularly to Fig. 2, the sheets are fed to the rollers 2 and 3. Any form of pile feeder or any other device for this purpose can be employed. If desired, the sheets may be fed by hand.

These rollers 2 and 3 it is assumed will turn at normal speed, that is to say,—they will propel the sheet forward and at the designed speed of the apparatus. The sheets will be supported by the table. They will be driven from the rollers 2 and 3 to the rollers 5 and 6. It is, therefore, apparent that the distance between the rollers 2 and 5 must be less than the length of the sheet. When the sheet gets under the control of the rollers 5 and 6, it will then be fed forward by these latter rollers. Continuing the movement, the rollers 5 and 6 will propel the sheet until either side of its leading edge comes in contact with the front registering gages 11 and 11ª. These gages, as has been described, are carried by the retarded belts 10. The difference in speed between the gages and the sheet will cause the sheet to buckle slightly behind the rollers 5 and 6. It will be noted that the holding-down blades 46 are provided with the cut-out portion 45, at this place, and as the sheet is supported by the table 4, it cannot buckle downward. The buckling, therefore, must be entirely upward. This buckling of the sheet will lift the feeling fingers 72, 72ª, as has been described. This lifting of the feeling fingers will make electric contact with the switches, and will energize the magnets 65. This will trip the latches 61, 61ª, which hold the drop rollers 6, 6ª down. The springs 60, 60ª, immediately raise the drop rollers 6, 6ª, and, at the same time, bring the drop rollers 8, 8ª, into active position. At this moment, the gages 11, 11ª, will be at the point of connection between the drop rollers 8, 8ª, and the rollers 7, 7ª. The rollers 7, 7ª, are driven by the belts 10, 10ª, and, consequently, they propel the sheet at the same speed that the gages 11, 11ª are traveling. The speed of the rollers 5, 5ª, and 6, 6ª, may be slightly above normal, to insure that the sheet will be always crowded against the gages. If the leading edge of the sheet is not presented to the gages, at either side simultaneously, the side advanced will drop the mechanism on that side and that side will no longer be driven by the rollers 5 and 6 or 5ª and 6ª. The other side, however, will continue to travel by engagement with the rollers 5 and 6, or 5ª and 6ª at normal speed, until it reaches the gages on that side 11 or 11ª. When this occurs, that edge of the sheet will be buckled upward, raising the feeling fingers 72 or 72ª, and tripping the mechanism on that side so that the drop roller 6 or 6ª, is raised. It is, therefore, apparent that the sheet is accurately brought against the gages 11 and 11ª, irrespective of whether it is slightly in advance of the gages, or if its front edge is not square across the machine. The cams 58 and 58ª, throw the rollers 6 and 6ª into action just before the sheet arrives to them. It also holds the drop rollers 6, 6ª, down positively, until the front edge of the sheet has passed the cut-out 45 in the holding-down blades 44. This prevents a curled edge of the sheet from tripping the mechanism, *i. e.*—from raising the feeling fingers before it reaches the gage. This feature of the invention is very valuable, as must be apparent. After the rollers 7 and 8 have forwarded the sheet well into engagement with the rollers 15 and 16, the cams 58 and 58ª, which control the rollers 6 and 6ª, as well as the rollers 8 and 8ª, immediately lift the drop rollers 8 and 8ª, sufficiently to clear the sheet. As described, however, the movement of the cams is not sufficient at this point to seat the drop rollers 6 and 6ª, consequently, the sheet will be drawn forward by the rollers 15 and 15ª and 16 and 16ª. The sheet now is entirely under control of the rollers 15 and 16 and 15ª and 16ª. These rollers, actuated by the side registering mechanism 32, will bring the sheet into side register, in the manner described in my co-pending application before referred to. The feeling fingers produce a very delicate and sensitive mechanism. It is apparent that the vertical movement, due to the distortion of the sheet, will be very much greater than the forward movement. It is, therefore, apparent that a very small forward movement of the sheet when it is arrested by the gages, will be magnified into a very much larger vertical buckling movement. The feeling fingers will, therefore, be moved to a sufficient angular extent to close the electric circuits, even if the forward movement of the sheet is very little, with a consequently small mis-alinement. It is also apparent that the feeling fingers and the switch fingers can be very nicely balanced on their pivots, so that the feeling fingers will respond to very light forces, due to very flexible sheets.

I have described my invention in connection with an electric circuit for actuating each drop roller. This is immaterial, however, as it is solely for purposes of illustration. An electric circuit is not essential, although I consider it to be the best for the purpose. Other devices (not illustrated) may be employed, to connect the feeling fingers with the latches 61, 61ª. In some situations, the latches themselves need not be used and may be omitted, the instrumentalities between the feeling fingers and the drop rollers being very much simplified.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent is:—

1. A feeding device having a gage, means for feeding a sheet to the gage, thereby buckling the sheet, and means actuated by the buckling of the sheet, for disengaging the feeding means.

2. A feeding device having a gage, means for feeding a sheet to the gage, thereby buckling the sheet, and a feeler actuated by the buckling of the sheet, for disengaging the feeding means.

3. A feeding device having a gage, a roller for feeding a sheet to the gage, means for holding the roller in operative position, thereby buckling the sheet, and means actuated by the buckling of the sheet, for disengaging the first means.

4. A feeding device having a gage, a roller for feeding a sheet to the gage, a lock for holding the roller in operative position, thereby buckling the sheet, and means actuated by the buckling of the sheet, for tripping the lock.

5. A feeding device having a gage, adjacent to each leading corner of the sheet to be fed, means adjacent to each edge of the sheet, for feeding the sheet to the gage, thereby buckling the sheet, and means, also adjacent to each edge of the sheet, and actuated by the buckling of the sheet, for disengaging the feeding means for that edge.

6. A feeding device having a gage, adjacent to each leading corner of the sheet to be fed, a roller adjacent to each edge of the sheet, for feeding the sheet to the gage, thereby buckling the sheet, and means also adjacent to each edge of the sheet, and actuated by the buckling of the sheet, for disengaging the feeding roller for that edge.

7. A feeding device having a gage adjacent to each leading corner of the sheet to be fed, means adjacent to each edge of the sheet, for feeding the sheet to the gage, thereby buckling the sheet, and a feeler also adjacent to each edge of the sheet, and actuated by the buckling of the sheet, for disengaging the feeding means for that edge.

8. A feeding device having a gage adjacent to each leading corner of the sheet to be fed, a roller adjacent to each edge of the sheet, for feeding the sheet to the gage, thereby buckling the sheet, a feeler also adjacent to each edge of the sheet, and actuated by the buckling of the sheet, for disengaging the feeding roller for that edge.

9. A feeding device having a plurality of gages, a plurality of means for feeding the sheet to the gage, thereby buckling the sheet, and means actuated by the buckling of the sheet between a gage and the adjacent feeding means, for disengaging such means.

10. A feeding device having a plurality of gages, a plurality of rollers for feeding the sheet to the gage, thereby buckling the sheet, and means actuated by the buckling of the sheet between a gage and the roller adjacent thereto, for disengaging such roller.

11. A feeding device having a plurality of gages, a plurality of rollers for feeding the sheet to the gage, thereby buckling the sheet, and a feeler actuated by the buckling of the sheet between a gage and the roller adjacent thereto, for disengaging such roller.

12. A feeding device having a gage, means for feeding the sheet to the gage, means for moving the gage in the same direction as the sheet, thereby buckling the sheet, and means actuated by the buckling of the sheet, for disengaging the feeding means.

13. A feeding device having a gage, means for feeding the sheet to the gage, means for moving the gage in the same direction as the sheet, thereby buckling the sheet, and a feeler actuated by the buckling of the sheet, for disengaging the feeding means.

14. A feeding device having a gage, a roller for feeding the sheet to the gage, means for moving the gage in the same direction as the sheet, thereby buckling the sheet, and a feeler actuated by the buckling of the sheet, for disengaging the feeding roller.

15. A feeding device having a gage, means for feeding the sheet to the gage, means for moving the gage in the same direction as the sheet, means for retarding the movement of the gage as the sheet comes into contact with it, to cause the sheet to buckle, and means actuated by the buckling of the sheet, for disengaging the feeding means.

16. A feeding device having a gage, means for feeding the sheet to the gage, means for moving the gage in the same direction as the sheet, means for retarding the movement of the gage as the sheet comes into contact with it to cause the sheet to buckle, and a feeler actuated by the buckling of the sheet, for disengaging the feeding means.

17. A feeding device having a gage, a roller for feeding the sheet to the gage, means for moving the gage in the same direction as the sheet, means for retarding the movement of the gage as the sheet comes into contact with it to cause the sheet to buckle, and means actuated by the buckling of the sheet, for disengaging the feeding roller.

18. A feeding device having a gage, a roller for feeding the sheet to the gage, means for moving the gage in the same direction as the sheet, means for retarding the movement of the gage as the sheet comes into contact with it to cause the sheet to buckle, and a feeler actuated by the buckling of the sheet, for disengaging the feeding roller.

19. A feeding device having a gage, a drop roller for feeding the sheet to the gage, means for moving the gage in the same direction as the sheet, thereby buckling the sheet, a feeler actuated by the buckling of the sheet, an electric circuit, including a magnet, energized by the movement of the said feeler, an armature actuated by the magnet, a latch for engaging the drop roller with the sheet, and means tending to move the drop roller away from the sheet, said latch being actuated by the movement of the armature.

20. A feeding device having a gage, a drop roller for feeding the sheet to the gage, thereby buckling the sheet, a feeler actuated by the buckling of the sheet, an electric circuit, including a magnet, energized by the movement of the said feeler, an armature actuated by the magnet, means for engaging the drop roller with the sheet, means tending to move the drop roller away from the sheet, said engaging means being actuated by the movement of the armature.

21. A feeding device having a gage, a drop roller for feeding the sheet to the gage, thereby buckling the sheet, means actuated by the buckling of the sheet, an electric circuit, including a magnet, energized by the movement of the said means, an armature actuated by the magnet, means for engaging the drop roller with the sheet, and means tending to move the drop roller away from the sheet, said engaging means being actuated by the movement of the armature.

22. A feeding device having a gage, a drop roller for feeding the sheet to the gage, thereby buckling the sheet, means actuated by the buckling of the sheet, an electric circuit, including a magnet, energized by the movement of the said means, an armature actuated by the magnet, means for engaging the drop roller with the sheet, means tending to move the drop roller away from the sheet, said engaging means being actuated by the movement of the armature.

23. A feeding device having a gage, a drop roller for feeding the sheet to the gage, means for moving the gage in the same direction as the sheet, thereby buckling the sheet, a feeler actuated by the buckling of the sheet, an electric circuit, including a magnet energized by the movement of the said feeler, an armature actuated by the magnet, means for engaging the drop roller with the sheet, means tending to move the drop roller away from the sheet, said engaging means being actuated by the movement of the armature.

24. A feeding device having a gage, a drop roller for feeding the sheet to the gage, means for moving the gage in the same direction as the sheet, means for retarding the movement of the gage as the sheet comes in contact with it thereby buckling the sheet, a feeler actuated by the buckling of the sheet, an electric circuit, including a magnet, energized by the movement of the said feeler, an armature actuated by the magnet, a latch for engaging the drop roller with the sheet, and means tending to move the drop roller away from the sheet, said latch being actuated by the movement of the armature.

25. A feeding device having gages in position to engage with the corners of the sheet, a feeding roller in advance of the gages, a drop roller adjacent to each edge of the sheet, means for engaging the drop roller with the sheet, a feeler adjacent to each edge of the sheet, an electric circuit controlled by each feeler, a latch for each drop roller, holding the latter in contact with the sheet, magnetic means within each circuit, for tripping the latch, each feeler and its controlled mechanism being independent, so that the front corners of the sheet coming into contact with the gages will buckle up the side edges of the sheet and actuate the feeling fingers, and raise the drop rollers in the order that the corners engage with the gages and thereby straighten the sheet.

26. A feeding device having gages in position to engage with the corners of the sheet, a feeding roller in advance of the gages, a drop roller adjacent to each edge of the sheet, means for engaging the drop roller with the sheet, a feeler adjacent to each edge of the sheet, an electric circuit controlled by each feeler, means for each drop roller, holding the latter in contact with the sheet, magnetic means within each circuit, for tripping the engaging means, each feeler and its controlled mechanism being independent, so that the front corners of the sheet coming into contact with the gages will buckle up the side edges of the sheet and actuate the feeling fingers, and raise the drop rollers in the order that the corners engage with the gages and thereby straighten the sheet.

27. A feeding device having gages in position to engage with the corners of the sheet, a feeding means in advance of the gages, a drop roller adjacent to each edge of the sheet, means for engaging the drop roller with the sheet, a feeler adjacent to each edge of the sheet, an electric circuit controlled by each feeler, a latch for each drop roller, holding the latter in contact with the sheet, magnetic means within each circuit, for tripping the latch, each feeler and its controlled mechanism being independent, so that the front corners of the sheet coming into contact with the gages will buckle up the side edges of the sheet and actuate the feeling fingers, and raise the drop rollers in the order that the corners engage with the gages and thereby straighten the sheet.

28. A feeding device having gages in position to engage with the corners of the sheet, a feeding roller in advance of the gages, a drop roller adjacent to each edge of the sheet, means for engaging the drop roller with the sheet, a holding-down blade adjacent to each drop roller, such blade having a recess therein to accommodate the buckling of the sheet, a feeler adjacent to each edge of the sheet, an electric circuit controlled by each feeler, a latch for each drop roller, holding the latter into contact with the sheet, magnetic means within each circuit, for tripping the latch, each feeler and its controlled mechanism being independent, so that the front corners of the sheet coming into contact with the gages will buckle up the side edges of the sheet into the recesses and actuate the feeling fingers, and raise the drop rollers in the order that the corners engage with the gages, and thereby straighten the sheet.

29. A feeding device having gages in position to engage with the corners of the sheet, a feeding roller in advance of the gages, a drop roller adjacent to each edge of the sheet, means for engaging the drop roller with the sheet, a holding-down blade adjacent to each drop roller, such blade having a recess therein to accommodate the buckling of the sheet, a feeler adjacent to each edge of the sheet, an electric circuit controlled by each feeler, engaging means for each drop roller, holding the latter in contact with the sheet, magnetic means within each circuit, for disengaging the engaging means, each feeler and its controlled mechanism being independent, so that the front corners of the sheet coming into contact with the gages will buckle up the side edges of the sheet into the recess and actuate the feeling fingers, and raise the drop rollers in the order that the corners engage with the gages, and thereby straighten the sheet.

30. A feeding device having gages in position to engage with the corners of the sheet, feeding means in advance of the gages, a drop roller adjacent to each edge of the sheet, means for engaging the drop roller with the sheet, a holding-down blade adjacent to each drop roller, such blade having a recess therein to accommodate the buckling of the sheet, a feeler adjacent to each edge of the sheet, an electric circuit controlled by each feeler, a latch for each drop roller, holding the latter in contact with the sheet, magnetic means within each circuit, for tripping the latch, each feeler and its controlled mechanism being independent, so that the front corners of the sheet coming into contact with the gages will buckle up the side edges of the sheet into the recess and actuate the feeling fingers, and raise the drop rollers in the order that the corners engage with the gages, and thereby straighten the sheet.

31. A feeding device having front and rear feeding rollers, a drop roller in coöperative relation therewith, a gage, means for moving the gage in the direction away from the rear feeding roller, a feeling finger located intermediate the front and rear drop rollers, said feeling finger being actuated by the buckling of the sheet when it is crowded against the gage, and connections between said finger and drop rollers, for raising the front drop roller and lowering the rear drop roller, said connections being actuated by the movement of the finger.

32. A feeding device having front and rear feeding rollers, a drop roller in coöperative relation therewith, a gage, means for moving the gage in the direction away from the rear feeding roller, means located intermediate the front and rear drop rollers, said means being actuated by the buckling of the sheet when it is crowded against the gage, and connections between said means and drop rollers, for raising the front drop roller and lowering the rear drop roller, said connections being actuated by the movement of said means.

33. A feeding device having the following instrumentalities adjacent to each edge of the sheet, said instrumentalities being independent of each other: front and rear feeding rollers, a drop roller in coöperative relation therewith, a gage, means for moving the gage in the direction away from the rear feeding roller, a feeling finger located intermediate the front and rear drop rollers, said feeling finger being actuated by the buckling of the sheet when it is crowded against the gage, and connections between said finger and drop rollers, for raising the front drop roller and lowering the rear drop roller on that edge of the sheet, said connections being actuated by the movement of the finger.

34. A feeding device having front and rear feeding rollers, and feeling fingers, means for supporting the same, and means for simultaneously adjusting the position of a portion of said feeding rollers and fingers to accommodate different widths of sheets.

35. A feeding device having feeding means and gaging devices, with holding-down blades adjacent to each side edge of the sheet, supporting means for the blades, the supporting means for a blade at each side of the sheet being pivoted to allow the blades to swing inwardly when a sheet is raised and means for simultaneously adjusting the feeding and gaging means and the holding down blades at one side of the sheet to accommodate different widths of sheets.

36. A feeding device having feeding and gaging means adapted to engage the side edges of the sheet, holding down blades adjacent to the side edges of the sheet and a supporting table, a portion of said feeding and gaging means and holding down blades being adjustable laterally, the width of said table also being adjustable to accommodate varying widths of sheets.

This specification signed and witnessed this 12th day of June, 1912.

WARD B. STORY.

Witnesses:
JAS. F. COLEMAN,
JOHN L. LOTSCH.